United States Patent
Cropper et al.

(10) Patent No.: US 10,394,594 B2
(45) Date of Patent: *Aug. 27, 2019

(54) MANAGEMENT OF A VIRTUAL MACHINE IN A VIRTUALIZED COMPUTING ENVIRONMENT BASED ON A CONCURRENCY LIMIT

(71) Applicant: International Business Machines Corporation, Armonk, NY (US)

(72) Inventors: Joseph W. Cropper, Rochester, MN (US); Jeffrey W. Tenner, Rochester, MN (US); Christine I. Wang, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 4 days.

This patent is subject to a terminal disclaimer.

(21) Appl. No.: 15/493,346

(22) Filed: Apr. 21, 2017

(65) Prior Publication Data

US 2017/0220377 A1   Aug. 3, 2017

Related U.S. Application Data

(63) Continuation of application No. 15/065,612, filed on Mar. 9, 2016, now Pat. No. 9,678,786, which is a continuation of application No. 14/945,248, filed on Nov. 18, 2015, now Pat. No. 9,684,533.

(51) Int. Cl.
*G06F 9/48* (2006.01)
*G06F 9/50* (2006.01)
*G06F 9/455* (2018.01)

(52) U.S. Cl.
CPC ........ *G06F 9/45558* (2013.01); *G06F 9/4881* (2013.01); *G06F 9/50* (2013.01); *G06F 2009/4557* (2013.01); *G06F 2009/45591* (2013.01)

(58) Field of Classification Search
CPC .................................................. G06F 9/45558
See application file for complete search history.

(56) References Cited

U.S. PATENT DOCUMENTS

| | | |
|---|---|---|
| 8,359,594 B1 | 1/2013 | Davidson |
| 8,826,292 B2 | 9/2014 | Heim |
| 2007/0055771 A1 | 3/2007 | Tantawl |
| 2010/0281478 A1 | 11/2010 | Sauls et al. |
| 2013/0086272 A1* | 4/2013 | Chen ............... G06F 9/4856 709/226 |
| 2014/0082165 A1 | 3/2014 | Marr et al. |
| 2015/0178129 A1 | 6/2015 | Dube |

(Continued)

OTHER PUBLICATIONS

VCenter Server and Host Management, Update 1, ESXi 5.1, vCenter Server 5.1, VMware, pp. 1-2, 196-198 (archived Aug. 2014).

(Continued)

*Primary Examiner* — Sisley N Kim
(74) *Attorney, Agent, or Firm* — Middleton Reutlinger

(57) ABSTRACT

One or more concurrency limits may be checked in connection with the performance of a virtual machine management operation such as a virtual machine deploy, resize or migration operation to enable the virtual machine management operation to be scheduled on a host for which no concurrency limits have been met.

20 Claims, 8 Drawing Sheets

(56) References Cited

U.S. PATENT DOCUMENTS

2015/0378760 A1* 12/2015 Su ................... G06F 9/45558
　　　　　　　　　　　　　　　　　　718/1
2016/0021024 A1*  1/2016 Parikh ............... G06F 9/45558
　　　　　　　　　　　　　　　　　　709/226

OTHER PUBLICATIONS

List of IBM Patents or Patent Applications Treated as Related.
U.S. Patent and Trademark Office, Notice of Allowance issued in related U.S. Appl. No. 15/065,612 dated Feb. 9, 2017.
U.S. Patent and Trademark Office, Notice of Allowance issued in related U.S. Appl. No. 14/945,248 dated Feb. 10, 2017.

* cited by examiner

MANAGEMENT OF A VIRTUAL MACHINE IN A VIRTUALIZED COMPUTING ENVIRONMENT BASED ON A CONCURRENCY LIMIT

BACKGROUND

The invention is generally related to computers and computer software, and in particular, to logically-partitioned and virtualized computing environments.

Computing technology has advanced at a remarkable pace, with each subsequent generation of computing system increasing in performance, functionality, and storage capacity, often at reduced cost. In addition, workload allocation of computing and other hardware resources is often employed to maximize the utilization of hardware resources such as processors, memories, networks, storage devices, etc., and thereby reduce the overall costs necessary for supporting a desired workload capacity. Optimizing workload allocation can also have a positive impact on power costs and environmental concerns due to a reduction in the amount of hardware resources required to support a given workload.

Many computer or data processing systems employ virtualization, also referred to as logical partitioning, which enables one or more individual physical computers to each run several operating environments, or operating systems, at once in a virtualized computing environment. In some instances, for example, a single physical computer, which may also be referred to as a host, can run a plurality of operating systems in a corresponding plurality of virtual machines (VMs), also referred to as logical partitions (LPARs). Each operating system resides in its own virtual machine, with each virtual machine allocated a part of a physical processor, an entire physical processor, or multiple physical processors from the computer. Additionally, a portion of the computer's memory may be allocated to each virtual machine. An underlying partition manager, often referred to as a hypervisor or virtual machine monitor (VMM), manages and controls the virtual machines. The hypervisor is typically a part of the system firmware and manages the allocation of resources to the operating systems and virtual machines. As such, one physical computer may run one or more virtual machines and thus virtualize the underlying hardware resources used by the applications, operating systems, and other program code configured to operate in those virtual machines.

Virtualization is increasingly used in data centers and cloud computing applications, which may provide for cost efficiencies through elastic computing, whereby hardware resources from multiple hosts are provisioned and de-provisioned based on workload changes. In such applications, individual workloads may change over time, and as such virtualization may be employed to effectively multiplex hardware resources over multiple workloads to provide an overall greater resource utilization. In order to balance costs, an assumption may be made that not all workloads will run with maximum resource requirements at the same time, so fewer hardware resources than the sum of all maximum resource requirements for workloads may be allocated for a given set of workflows, resulting in the hardware resources being overcommitted. As one example, a cloud provider may allocate more virtual processors (CPUs) across multiple virtual machines on a particular host computer under the assumption that some of the virtual machines will only run at off-peak hours when other virtual machines are shut down or otherwise deactivated.

Some data centers and cloud computing applications may also support the virtualization of other types of hardware resources, such as storage devices and networks, which may enable virtual machines to access virtual networks and/or storage devices, and with the particulars of the underlying hardware supporting such virtual entities managed in a manner that is effectively hidden from the virtual machines. The allocation of such hardware resources to virtual machines may also impact performance and efficiency, as overloading networks and/or storage devices can lead to slow response times, and in some instances, to an inability of a virtual machine to connect to an underlying hardware resource.

Virtualized computing environments may also utilize various technologies that may be used to improve performance and/or reliability. For example, high availability techniques may be employed to handle fault situations, e.g., to automatically restart a virtual machine if the virtual machine is detected to have gone down, to rebuild a virtual machine on a new host if an original host unexpectedly crashes or loses power. In addition, load balancing may be employed to dynamically migrate virtual machines to different hosts, e.g., whenever one host is overloaded and excess capacity is available on another host. Furthermore, energy efficiency is often a concern in many data centers, and as a result, it may be desirable in some instances to consolidate virtual machines on fewer numbers of hosts to enable unused hosts to be powered down.

SUMMARY

According to an embodiment of the present invention, a virtualized computing environment may be managed by monitoring active virtual machine management operations on a first host among a plurality of hosts in the virtualized computing environment, where each active virtual machine management operation includes a plurality of sub-operations with associated concurrency limits, receiving a request to perform a virtual machine management operation, in response to receiving the request, determining whether any of the concurrency limits associated with the sub-operations for the requested virtual machine management operation has been met based at least in part on the monitored active virtual machine management operations on the first host, and initiating performance of the requested virtual machine management operation on a second host among the plurality of hosts in response to determining that at least one concurrency limit associated with at least one sub-operation for the requested virtual machine management operation has been met.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
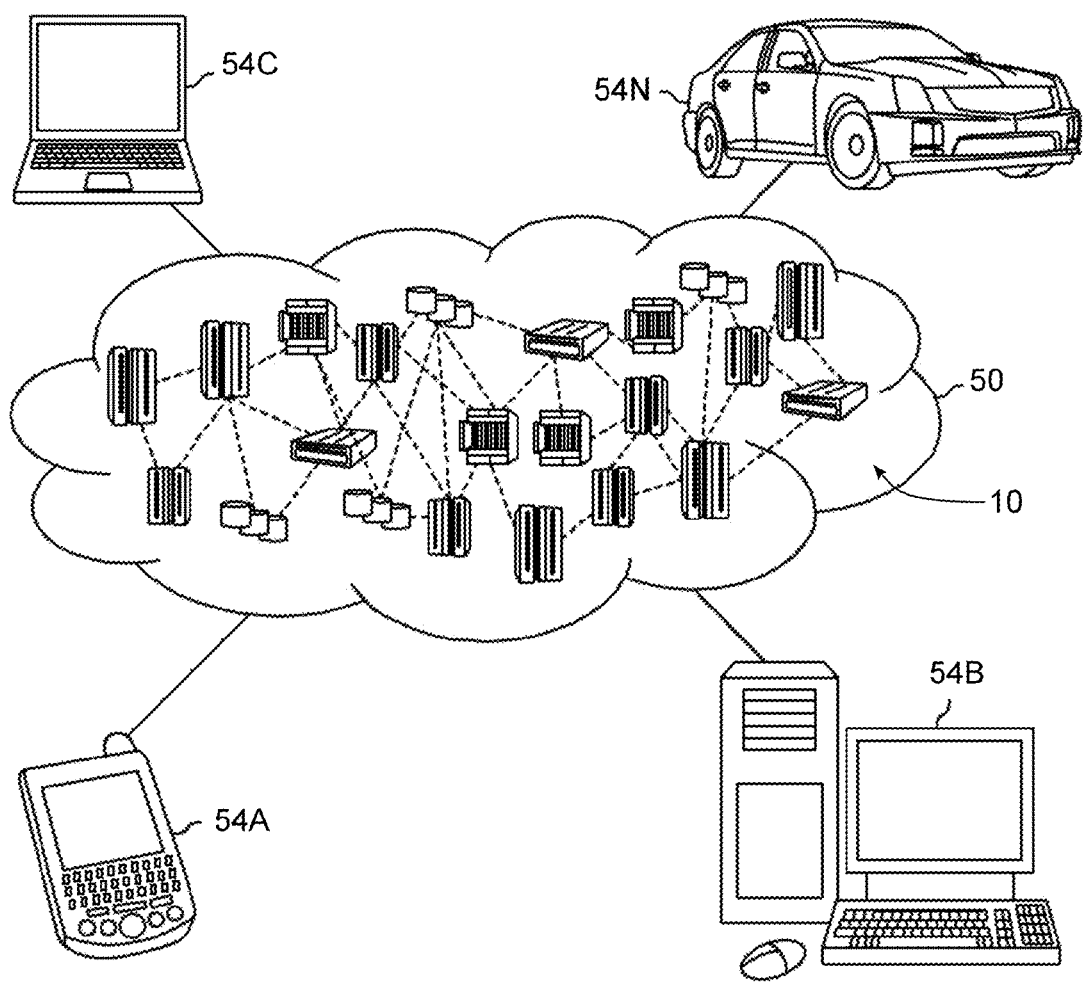
FIG. 1 depicts an example cloud computing environment consistent with the invention.

It is understood in advance that although this disclosure includes a detailed description on cloud computing, implementation of the teachings recited herein are not limited to a cloud computing environment. Rather, embodiments of the invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to the Drawings, wherein like numbers denote like parts throughout the several views, FIG. 1 depicts an illustrative cloud computing environment 50 suitable for use in embodiments consistent with the invention. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
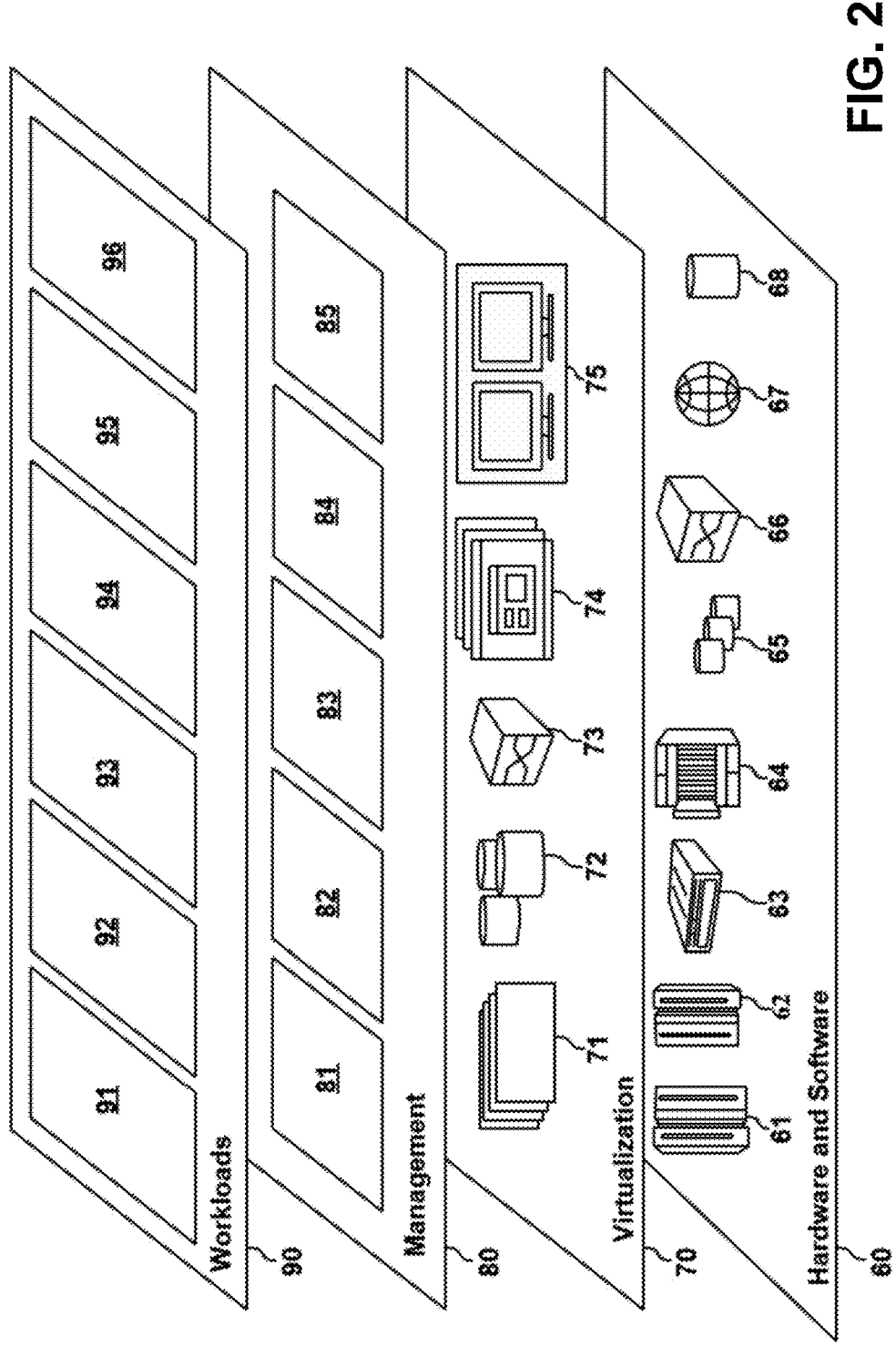
FIG. 2 depicts abstraction model layers according to an example embodiment consistent with the invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Figure 3A:
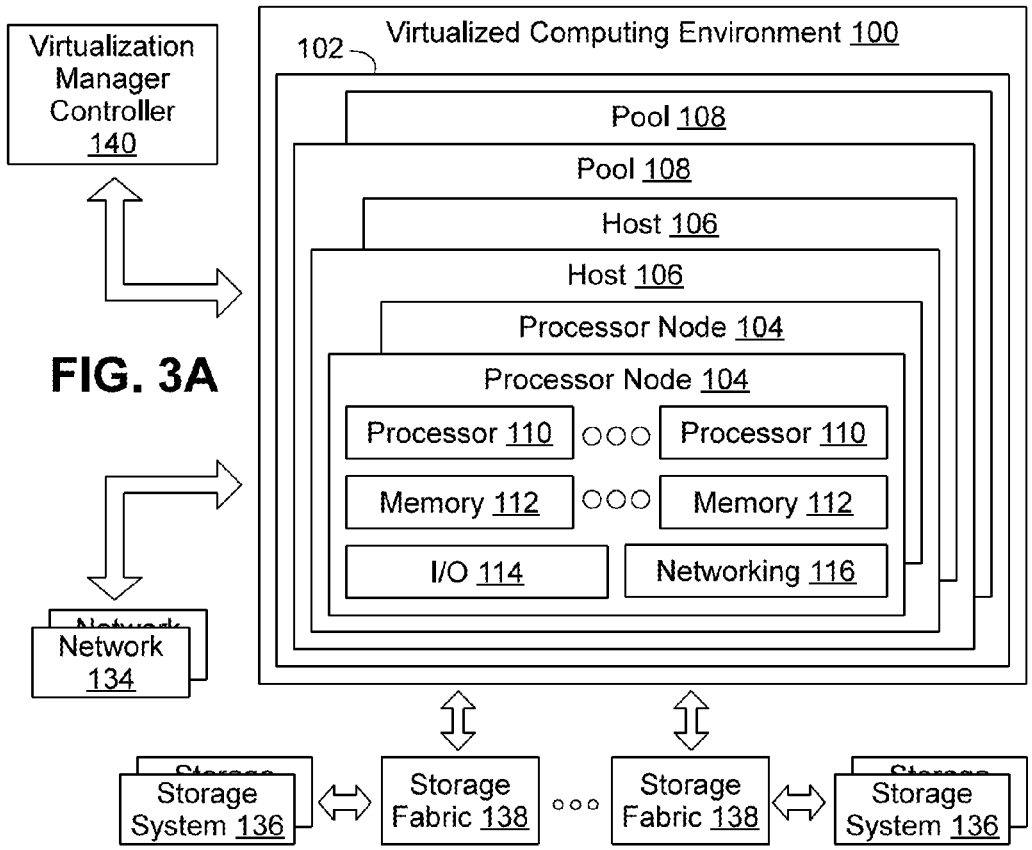
FIGS. 3A and 3B are block diagrams of an example hardware (FIG. 3A) and software (FIG. 3B) environment suitable for implementing a virtualized computing environment consistent with the invention.
Figure 3B:
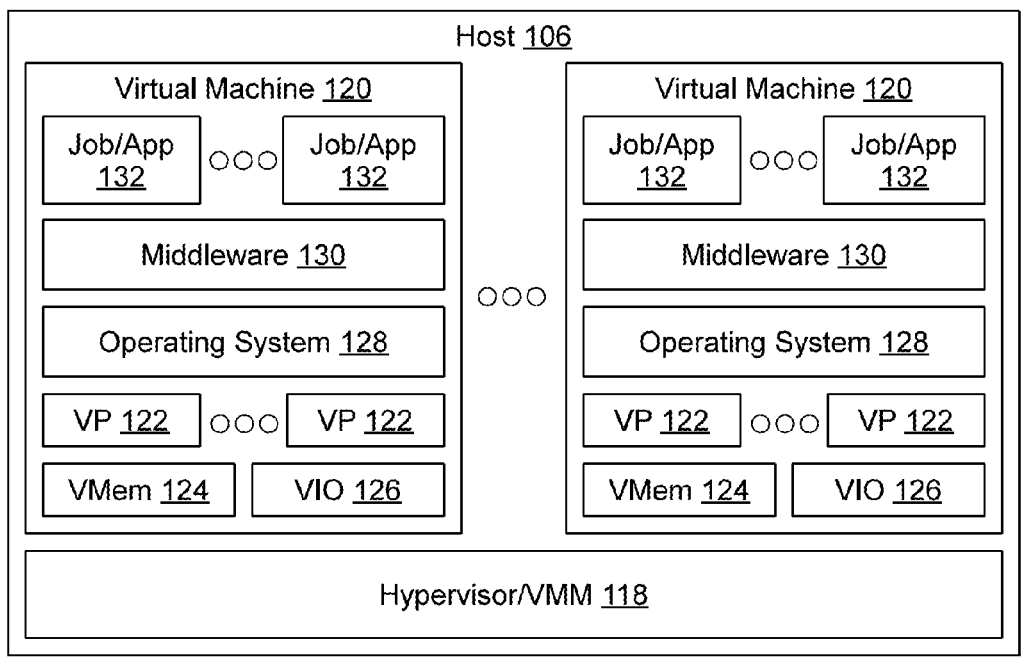

FIGS. 3A-3B illustrate the principal hardware and software components in a virtualized computing environment or apparatus 100 consistent with the invention, and suitable for implementation in a cloud computing environment such as environment 50, as well as in other cloud and/or non-cloud computing environments. As shown in FIG. 3A, apparatus 100 may include a multi-node data processing system 102 where the physical hardware is distributed among a plurality of physical processor nodes 104 disposed in a plurality of hosts or computer systems 106, with the hosts 106 disposed in one or more pools 108. Each processor node 104 includes one or more processors 110, one or more memory devices 112, and in some embodiments, additional hardware such as input/output (I/O) hardware 114 (e.g., one or more input/output (I/O) adapters) and/or networking hardware 116. Appropriate networking functionality (not shown) may also be used to provide data communication between the various processor nodes 104 and hosts 106, as well as other external systems.

Apparatus 100 may be implemented using any of a number of different architectures suitable for implementing a virtualized environment. For example, in one embodiment, apparatus 100 may include one or more of a Power 770, 780 or 795 system available from International Business Machines Corporation, the configuration of which will be apparent to one of ordinary skill in the art having the benefit of the instant disclosure. It will be appreciated, however, that other architectures suitable for executing virtualized environments may be used in other embodiments of the invention, so the invention is not limited to the particular architecture disclosed herein.

Each processor 110 may be implemented as a single or multi-threaded processor and/or as a single or multi-core processor, while each memory 112 may be considered to include one or more levels of memory devices, e.g., a DRAM-based main storage, as well as one or more levels of data, instruction and/or combination caches, with certain caches either serving individual processors or multiple processors as is well known in the art. In addition, the memory of apparatus 100 may be considered to include memory storage physically located elsewhere in apparatus 100, e.g., any cache memory in a processor, as well as any storage capacity used as a virtual memory, e.g., as stored on a mass storage device or on another computer coupled to apparatus 100.

Apparatus 100 operates under the control of one or more kernels, hypervisors, operating systems, etc., and executes or otherwise relies upon various computer software applications, components, programs, objects, modules, data structures, etc., as will be described in greater detail below. Moreover, various applications, components, programs, objects, modules, etc. may also execute on one or more processors in another computer coupled to apparatus 100 via network, e.g., in a distributed or client-server computing environment, whereby the processing required to implement the functions of a computer program may be allocated to multiple computers over a network.

For example, FIG. 3B illustrates various software components 118-132 that may be resident within a host 106 in apparatus 100. A hypervisor or virtual machine monitor (VMM) 118 may host one or more virtual machines (VMs) 120 and may allocate to each virtual machine 120 a portion of the physical hardware resources of host 106 (e.g., processor, memory and/or IO resources associated with one or more processor nodes 104), represented here by one or more virtual processors (VPs) 122, a virtual memory (VMem) 124 and virtual input/output (VIO) resources 126. Each virtual machine 120 may in turn host an operating system 128 and optionally middleware 130, as well as one or more jobs and/or applications 132. It will be appreciated that each virtual machine 120, which may also be referred to as a logical partition, virtual server or virtual computer, may operate in a manner that emulates a separate physical computer, and as such, may host practically any software components capable of being hosted by a computer.

Additional hardware and/or software components may also be resident in apparatus 100, e.g., mass storage hardware, external input/output devices such as printers or displays, and management hardware and/or software, e.g., a hardware management console (HMC) through which the hardware and/or software configuration of the apparatus may be managed by an administrator. Further, in the illustrated embodiments, connectivity to one or more external networks 134 may also be supported, as may connectivity to one or more storage systems 136 through one or more storage fabrics 138. Virtualized environments may be implemented in an innumerable number of manners, and may include an innumerable number of hardware and/or software variations, and as such, the invention is not limited to the particular implementation disclosed herein.

It will be appreciated that the present invention may be a system, a method, and/or a computer program product. The computer program product may include a computer readable storage medium (or media) having computer readable program instructions thereon for causing one or more processors to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the drawings illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition, computer readable program instructions, of which one or more may collectively be referred to herein as "program code," may be identified herein based upon the application within which such instructions are implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the example environment illustrated in FIGS. 1, 2, 3A and 3B is not intended to limit the present invention. Indeed, those skilled in the art will recognize that other alternative hardware and/or software environments may be used without departing from the scope of the invention.

Management of a Virtual Machine in a Virtualized Computing Environment Based on a Concurrency Limit Rapid deployment, resizing, and migration of virtual machines is desirable in many virtualized computing environments, and particularly in cloud computing environments where it is desirable to meet the demands of numerous customers and to do so in a cost-effective manner. Deployment, resizing and migration of a virtual machine may be considered for the purposes of this disclosure to be types of virtual machine management operations, i.e., operations that are used to manage the configuration and/or operating environment of one or more virtual machines resident within a virtualized computing environment. Virtual machine deployment generally refers to the creation and initialization of a virtual machine into an operating state on a host. Virtual machine resizing generally refers to altering the resource allocation of a virtual machine that has already been deployed, e.g., to add or remove processor resources, memory resources, IO resources, storage resources, etc. Virtual machine migration generally refers to transferring a virtual machine from one host to another host such that the virtual machine thereafter runs on the other host. Other types of virtual machine management operations may include operations such as virtual machine delete operations that remove a virtual machine from a virtualized computing environment, virtual machine capture operations that create an image or snapshot of the state of a virtual machine at a particular point in time, virtual machine attach volume operations that attach a new storage volume to a virtual machine, virtual machine remote restart operations that restart virtual machines, and virtual machine suspend operations that effectively pause the operation of an active virtual machine. It will be appreciated that the aforementioned list of virtual machine management operations is not exclusive, and other types of virtual machine management operations will be appreciated by those of ordinary skill in the art having the benefit of the instant disclosure.

The throughput (e.g., in terms of operations/hour) of performing these types of virtual machine management operations may be enhanced through support for performing multiple operations in parallel. However, many virtual machine management operations perform a number of different tasks, referred to herein as sub-operations, that involve various components within a virtualized computing environment (e.g., various components, entities or layers within a cloud and/or virtualization stack, which are collectively referred to herein as components), and for which limits may exist that limit the number of concurrent management-related activities or tasks that can be handled by those components. These limits, which are referred to herein as concurrency limits, can result in the formation of bottlenecks that limit throughput of the higher order virtual machine management operations. A deployment operation, for example, may include sub-operations such as creating a virtual machine, attaching an image to the virtual machine, creating a boot volume for the virtual machine, zoning a switch in a network or storage subsystem, etc., and each of these sub-operations may be associated with concurrency limits representing the maximum number of concurrent sub-operations that may be handled by any involved components (e.g., limits on the number of hosts that can be connected to a storage volume or fabric switch at one time, limits on the number of concurrent activities that can be handled by a hypervisor, storage device, or switch, limits on the number of concurrent activities that can be handled by a virtualization or network library, etc.)

As an example, as a part of deploying, migrating, or resizing a virtual machine, placement policies may be used to decide on which host a virtual machine should be placed. The placement logic used in some virtualized computing environments, for example, may use metrics such as availability of required processor (CPU), memory, and storage resources to determine a set of hosts that are considered to be candidates to host the virtual machine. The placement logic may also consider properties of the host such as architecture (e.g., x86 or Power), the storage accessible from the host, the network the host is on and other attributes. In addition, administrators may be permitted to define placement policies, e.g., to spread virtual machines evenly across hosts to balance workload or to pack as many virtual machines as possible onto a host before placing virtual machines on other hosts to conserve energy. When many deploy, resize or migration operations are performed concurrently, however, the sub-operations incorporated into such operations may exceed the limits of concurrent activities of a chosen host's hypervisor, the storage subsystem, or other aspects of the virtualization and cloud management stack for the chosen host. Further, with a packing placement policy, a greater risk of meeting concurrency limits generally exists since by design the intent is to pack virtual machines onto one host in order to fill up that host before moving to the next.

When concurrency limits of a cloud and/or virtualization stack are met (i.e., when the concurrency limits are reached and/or exceeded), some virtualized computing environments may make no attempt to limit virtual machine management operations and/or any of their associated sub-operations and simply return any error returned by an involved component in the virtualized computing environment (e.g., a timeout error). In other environments, requests for operations or sub-operations may initially be placed in a queue and handled in a first-in, first-out manner, and if any requests sit in the queue too long, a timeout error may be returned. When an operation times out or otherwise fails due to an error, manual intervention by an administrator may be required, or the operation may be cancelled, resulting in lack of availability or performance of a customer workload.

In some embodiments consistent with the invention, on the other hand, concurrency limits may be checked in association with performing virtual machine management operations to enable such operations to be handled by hosts for which concurrency limits have not been met. In some embodiments, for example, metrics collection and filters may be incorporated into a placement engine to monitor concurrent virtual machine management operations such as deploys, resizes, and migrations relative to concurrency limits within virtualization and/or cloud management stacks (e.g., concurrency limits of hypervisors, storage systems, etc.) and filter out hosts for which their concurrency limits have been met, such that a requested virtual machine management operation may be performed on another host without waiting. Furthermore, in some embodiments, a host may be selected without regard to concurrency limits, and if any concurrency limits are met for a particular operation, the operation may be delayed for one or more polling cycles to check if concurrency limits are still met, and if so, to reschedule the operation on another host.

In one embodiment, for example, the herein-described functionality may be implemented within placement or scheduler logic in a cloud or virtualized computing environment, e.g., within a virtualization manager such as is discussed below in connection with FIG. 4, to filter hosts using knowledge of the concurrency limits for the cloud and/or virtualization stack components. Concurrency limits that may be considered include, but are not limited to concurrency limits such as a hypervisor concurrency limit such as where a hypervisor can support a maximum of X concurrent virtual machine creation operations, a storage system concurrency limit such as where a storage system can support a maximum of X concurrent create volume operations, a network concurrency limit such as where a Fibre Channel fabric switch can support a maximum of X concurrent zoning operations, a virtualization library concurrency limit such as where a virtualization library can support a maximum of X concurrent virtual machine live migrations, etc.

In the aforementioned embodiment, during a virtual machine management operation (e.g. a deploy, resize, or migration), the virtualization manager may maintain a count of the number of active virtual machine management operations on one or more hosts. Further, in some embodiments, if virtual machine management operations may be initiated out-of-band from the virtualization manager (e.g. if users can initiate virtual machine deployments externally from a virtualization manager), the virtualization manager may query any relevant components to determine how many activities are currently active. The virtualization manager may then add filters to its host selection logic to exclude hosts having components where the concurrency limits are already met. For example, for a deployment operation, if all of the storage systems to which a particular host has access have reached their limits for the number of concurrent create volume operations, that host may be excluded from consideration for the deployment, such that the placement or scheduler logic will select another host that can perform the deployment without conflict and/or waiting.

In addition, and particularly where a packing policy is implemented, it may also be desirable to enable a virtual machine management operation to be temporarily delayed in order to wait for a component associated with a desired host to become available. For example, a configurable option may be provided to handle a busy host by waiting for some specified time and/or for some number of attempts before moving the operation to another host. If concurrent activities on a component initially determined to have met a concurrency limit thereafter fall below the concurrency limit within that time and/or during those attempts, the delayed operation may be released and initiated on the host. Otherwise, if the concurrency limit is still met, the virtualization manager may repeat a placement or scheduling operation with a filter that excludes the host as a target so that the virtual machine is placed on some other host.

In some embodiments consistent with the invention, active virtual machine management operations may be monitored on one or more hosts in a virtualized computing environment. The active virtual machine management operations may each have multiple sub-operations, and each sub-operation may be associated with one or more concurrency limits. Each concurrency limit represent a limit on the number of concurrent activities that can be handled by an associated component in a virtualized or cloud computing environment, and as such, a particular sub-operation may have one or more associated concurrency limits based upon which components are involved with the performance of the sub-operation, as well as which concurrency limits exist for each of the involved components. As will become more apparent below, the monitoring of virtual machine management operations may be performed on demand, e.g., upon receipt of a request to perform a virtual machine management operation, or may be performed substantially continuously, e.g., using a background thread or process. Moreover, the monitoring may be performed individually for one or more hosts, or may be performed for an entire virtualized or cloud computing environment, and as such, monitoring functionality may be resident on particular hosts, distributed among multiple hosts, and/or performed via a component separate from any particular host.

In addition, in some embodiments consistent with the invention, and in response to receiving a request to perform a virtual machine management operation, a determination may be made as to whether any of the concurrency limits associated with the sub-operations for a requested virtual machine management operation has been met on one or more hosts based at least in part on the monitored active virtual machine management operations for the one or more hosts. Then, in response to determining that at least one concurrency limit associated with at least one sub-operation for the requested virtual machine management operation has been met, performance of the requested virtual machine management operation may be initiated on a different host, thereby avoiding any delay or error that might otherwise occur as a result of scheduling the virtual machine management operation on a host for which one or more concurrency limits has been met.

Concurrency limits may be determined in different manners in different embodiments, and may be determined in different manners for different components in a virtualized or cloud computing environment. For example, some concurrency limits may be determined from configuration values set by a cloud management software administrator. In addition, some concurrency limits may statically defined and/or hard-coded, and may be determined from values set by documented limits or other specifications.

Further, some concurrency limits may be determined by querying a component, e.g., through an API for the component. Likewise, in some embodiments, components may also be queried to retrieve a count of active sub-operations or other activities for that component, or a count of the number of additional sub-operations or activities that could be handled by that component based upon the current status of the component. Also, in some embodiments, a determination of whether a concurrency limit has been met may be made within a component, such that a query to the component may return a simple busy/available response based upon the concurrency limits and current activities of the component.

Figure 4:
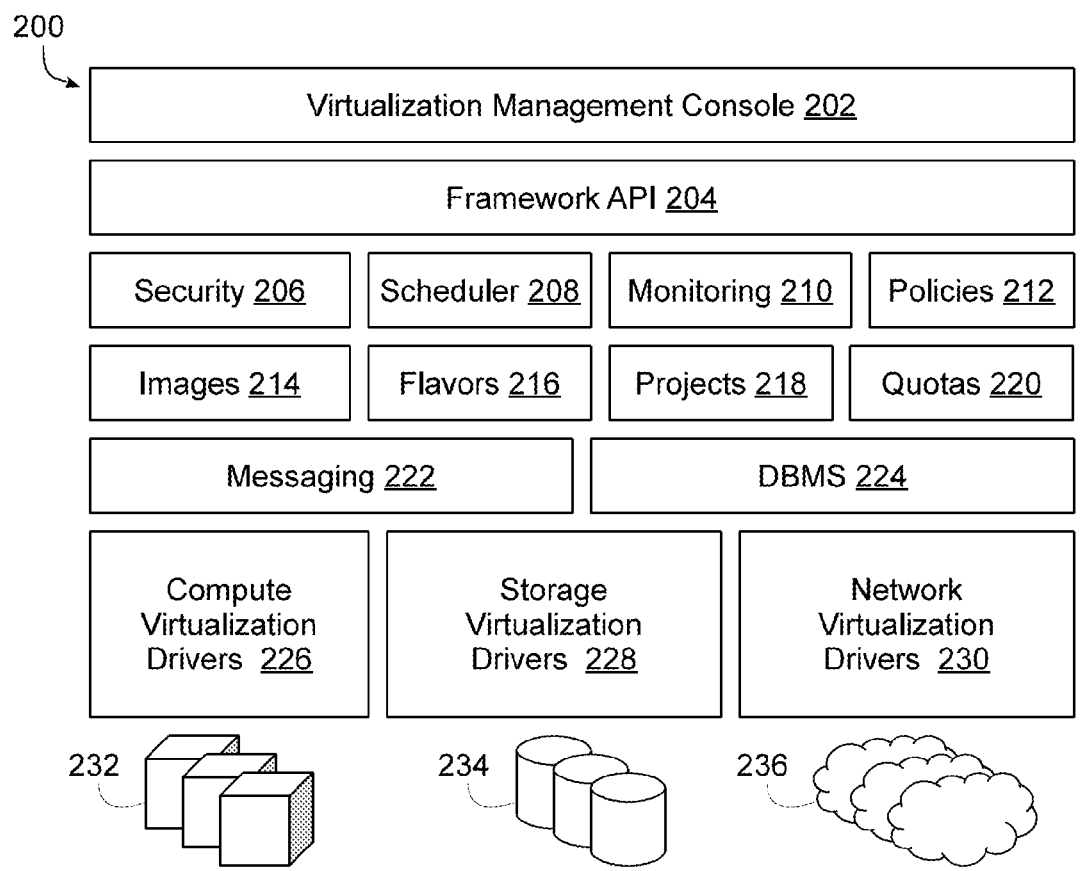
FIG. 4 is a block diagram of example software components in a cloud computing framework for use in performing virtualization management in the virtualized computing environment of FIGS. 3A-3B.

Now turning to FIG. 4, virtual machine management operations may be implemented within a cloud computing framework such as framework 200. Framework 200 may be based in some embodiments on the OpenStack architecture, and may include a virtualization management console 202 that interfaces with the framework through a framework API 204. Framework 200 may be considered to implement at least a portion of a computer-implemented virtualization or cloud manager, and may include a management service layer includes a security service 206, a scheduler service 208, and monitoring service 210, which respectively provide security, virtual machine scheduling/placement and event monitoring functionality. Additional management functionality manages various persisted entities in the framework, including policies 212, images 214, flavors 216, projects 218 and quotas 220. Policies 212 may include policies related to virtualization management. Images 214 refer to disk or server images for virtual machines, including images used for templates, as well as images used for backups. Flavors 216 refer to virtual hardware templates that define various configuration settings for virtual machines, e.g., sizes for virtual memory, disk, virtual CPUs, etc. Projects 218 refer to tenants, or groups of users, and quotas 220 refer to operational limits established for different projects.

A middleware layer may include a messaging service 222, e.g., an AMQP (Advanced Message Queuing Protocol) message broker, and a database service (DBMS) 224. In addition, virtualization drivers, e.g., compute virtualization drivers 226, storage virtualization drivers 228, and network virtualization drivers 230 respectively interface with physical compute resources 232, physical storage resources 234 and physical network resources 236.

Elements of framework 200 may be implemented, for example, in a virtualization manager controller 140 (FIG. 3A), with other elements implemented within one or more hosts, e.g., within one or more virtual machines resident on one or more hosts. In other embodiments, however, various elements of framework 200 may be implemented in other hardware, whether external or internal to a virtualized computing environment.

Framework 200 may be configured to receive requests from users such as administrators or customers for various types of virtual machine management operations, and in response thereto, to initiate performance of those operations within a virtualized or cloud computing environment. As noted above, virtual machine management operations may include one or more sub-operations, and each sub-operation may include one or more associated concurrency limits that are in turn associated with one or more components to which the sub-operations are directed. In the illustrated embodiment, these operations may be effectively tracked by logging the start and completion of each operation such that the number of active operations may be determined at a given time. In other embodiments, however, other mechanisms may be employed to determine whether any relevant concurrency limits are met that might preclude performance of a virtual machine management operation on a particular host, so the invention is not limited to the particular tracking mechanism described hereinafter.

Figure 5:
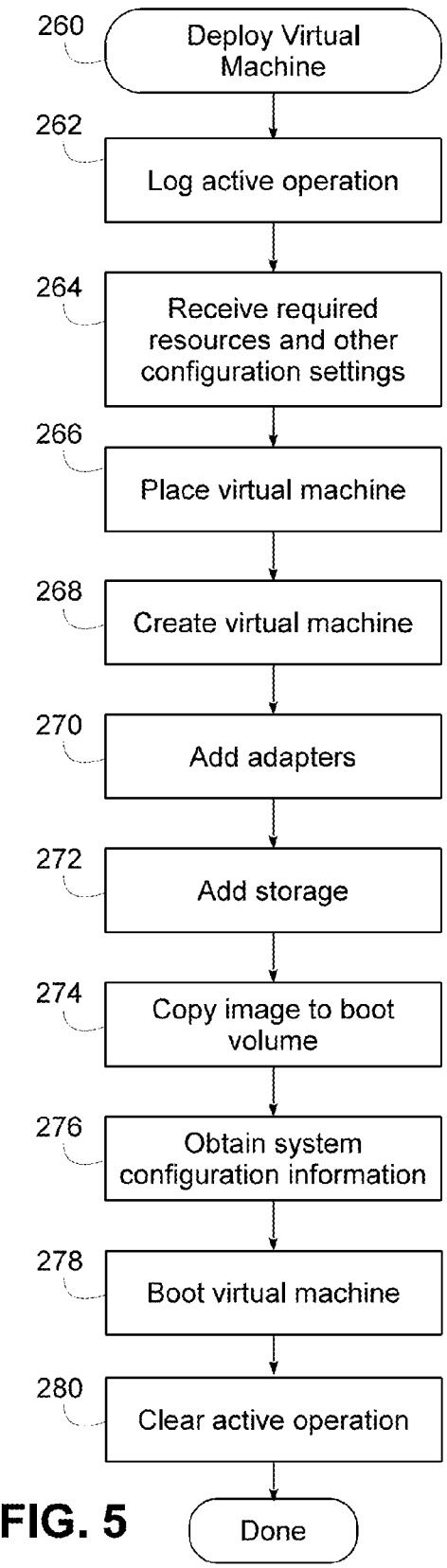
FIG. 5 is a flowchart illustrating a sequence of operations for deploying a virtual machine in the virtualized computing environment of FIGS. 3A-3B.
Figure 6:
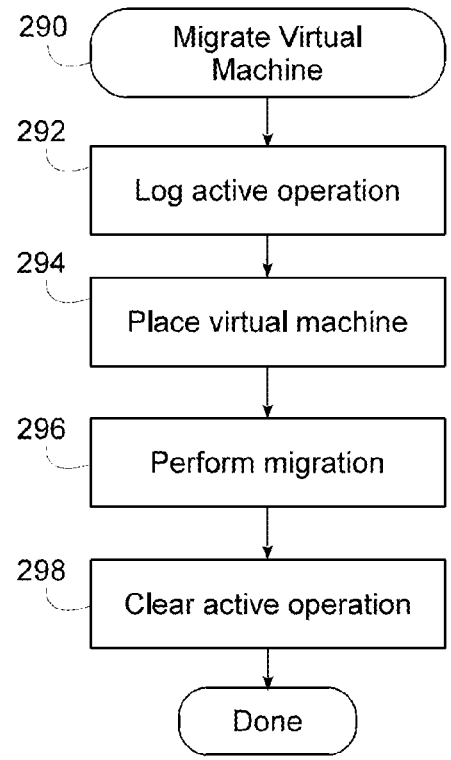
FIG. 6 is a flowchart illustrating a sequence of operations for migrating a virtual machine in the virtualized computing environment of FIGS. 3A-3B.

As noted above, various types of virtual machine management operations may be supported, and FIGS. 5 and 6 illustrated two such types of operations, a virtual machine deployment operation (FIG. 5) and a virtual machine migration operation (FIG. 6). Application of the same techniques to other types of virtual machine management operations would be well within the skill of the ordinary artisan having the benefit of the instant disclosure.

FIG. 5, in particular, illustrates an example sequence of operations 260 for deploying a virtual machine in a virtualized computing environment such as illustrated in FIGS. 3A-3B. The sequence of operations may be initiated, for example, in response to a request for a virtual machine management operation such as a virtual machine deployment operation, and may be performed, for example, by framework 200 of FIG. 4. The virtual machine deployment operation may include a number of sub-operations, including, for example, creating a virtual machine, adding adapters, adding storage, copying an image to a boot drive, and booting or starting the virtual machine, and some or all of these sub-operations may include associated concurrency limits for any components with which these sub-operations are performed.

In order to track the number of active operations on one or more hosts, an active operation may be initially logged in block 262. The logging may be performed individually and locally on a host-by-host basis, or may be logged across all hosts. The logging may also indicate the type of active operation such that the sub-operations and the concurrency limits associated therewith can be ascertained when determining whether a virtual machine management operation may be performed on a particular host based upon concurrency limits.

Next, block 264 receives any required resources and/or other configuration settings for the virtual machine to be deployed. A user (e.g., an administrator) may specify, for example, a desired number of virtual processors, a desired amount of virtual memory, a desired amount of virtual storage, desired network and/or storage connections, etc., as well as settings such as performance tunings, virtual machine name, type of storage, number of storage disks or volumes, etc. In addition, a user may specify a template or flavor upon which the virtual machine is to be based.

Next, in block 266, the virtual machine to be deployed is placed on a host, i.e., a host for the virtual machine is selected from a plurality of hosts in the virtualized computing environment, and using a host placement algorithm discussed in greater detail in connection with FIG. 7 below. A host may selected based upon various factors, including compatibility with the virtual machine requirements and settings specified by the administrator as well as optimizing the overall performance of the virtualized environment by balancing workloads. Moreover, as will be discussed in greater detail below, a host may be selected in part based upon availability in view of one or more concurrency limits.

Next, once a host is selected for the virtual machine, the virtual machine is created in block 268, e.g., by instructing virtual machine management functionality on the selected host to create a new virtual machine on that host. Next, in block 270, one or more virtual adapters may be added to the virtual machine, e.g., to create network and/or storage connectivity, and in block 272, one or more virtual storage volumes may be added for the virtual machine. Then, in block 274, a virtual machine image is copied to the boot volume, e.g., from a collection of pre-stored images including the operating system and application(s) to execute in the virtual machine.

Block 276 next obtains system configuration information for the operating system of the virtual machine, e.g., information such as host name, IP address, etc. In some embodiments, for example, a virtual optical drive may be added to the virtual machine with the system configuration information provided on a virtual optical disc. In other embodiments, the system configuration information may be obtained in another manner, e.g., via a networked metadata service. Then, in block 278, the virtual machine is booted. Booting a virtual machine is analogous to powering on a physical computer and bringing it into a fully active state, and thus may be considered to incorporate the initialization and execution of program code of the virtual machine to bring the virtual machine into a fully active state. Upon completion of block 278, the virtual machine deployment operation is complete, and as such, block 280 may clear the active operation from the log of active operations.

It will be appreciated that the deployment of virtual machines may be implemented in a number of different manners in different virtualized environments. As such, a number of different alternative processes may be used in other embodiments, as will be appreciated by one of ordinary skill in the art having the benefit of the instant disclosure.

FIG. 6 illustrates an example sequence of operations 290 for migrating a virtual machine in a virtualized computing environment such as illustrated in FIGS. 3A-3B. The sequence of operations may be initiated, for example, in response to a request for a virtual machine management operation such as a virtual machine migration operation, and may be performed, for example, by framework 200 of FIG. 4. As with the virtual machine deployment operation illustrated in FIG. 5, an active operation may be initially logged in block 292, and then in block 294, the virtual machine to be migrated may be placed on a different host. In some embodiments, the virtual machine migration operation may specify a particular host to which the virtual machine should be migrated, while in other embodiments, a placement algorithm similar to that used for deployment may be used. Next, once a new host is selected for the virtual machine, the migration is performed in block 296, in a manner understood by one of ordinary skill having the benefit of the instant disclosure. Upon completion of block 296, the virtual machine migration operation is complete, and as such, block 298 may clear the active operation from the log of active operations.

Figure 7:
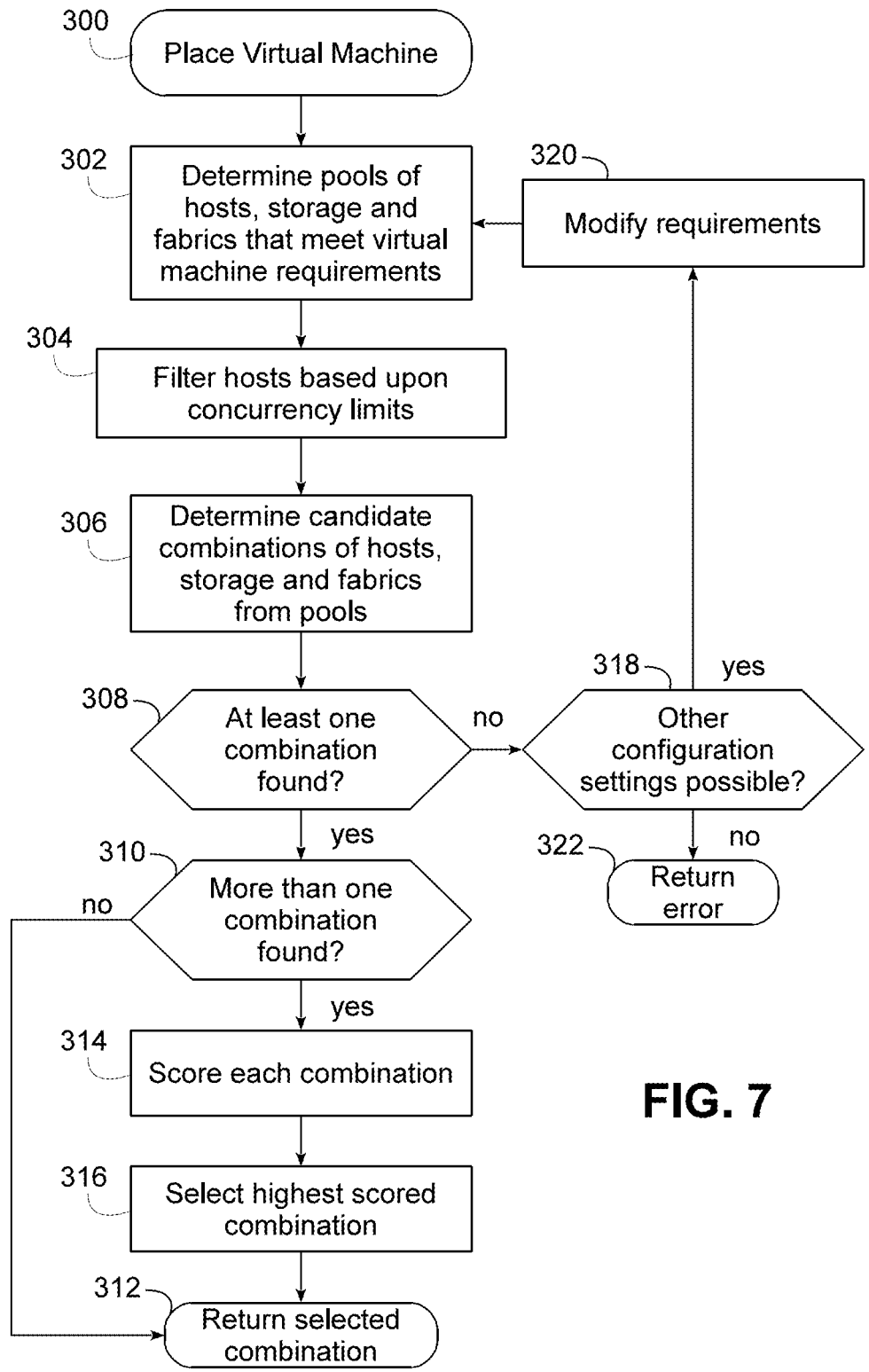
FIG. 7 is a flowchart illustrating a sequence of operations for placing a virtual machine in the virtualized computing environment of FIGS. 3A-3B.

Now turning to FIG. 7, a sequence of operations 300 is illustrated for placing a virtual machine, e.g., to implement block 266 of FIG. 5 and/or block 294 of FIG. 6 in some embodiments of the invention. FIG. 7 may be considered to in part implement a host placement algorithm that selects a host for a virtual machine management operation. First, block 302 determines pools of hosts, storage systems and fabrics that meet the requirements of the virtual machine to be deployed, e.g., based upon any particular storage, architectures, protocols, network resources, resource capacity requirements, etc. that the virtual machine will need in order to handle its workload. Next, block 304 filters hosts based upon concurrency limits, e.g., in a manner discussed below in connection with FIG. 8.

Next, block 306 determines candidate combinations of hosts, storage and fabrics from the pools that are compatible with one another and that have sufficient capacity to host the virtual machine. In determining whether a particular combination is a suitable candidate, block 306 may consider capacities/limits of hardware resources on a host, e.g., processor resources, memory resources, adapter resources, etc., and in some embodiments, overcommit ratios may be used in the determination of capacities of such hardware resources. Likewise, block 306 may consider capacities/limits of storage systems when determining whether a combination is a suitable candidate.

Next, block 308 determines whether at least one candidate combination has been found. If so, block 310 determines whether more than one candidate combination has been found, and if only one candidate combination has been found, control passes to block 312 to return the single candidate combination as the combination selected by the placement operation.

If more than one candidate combination has been found, however, block 310 passes control to block 314 to score each candidate combination, and then to block 316 to select the highest scored candidate combination. Control then passes to block 312 to return the selected candidate combination.

When scoring candidate combinations, various factors may be considered, and various weights may be applied to those factors, in order to optimize the placement of a virtual machine within a virtualized environment. For example, various load balancing algorithms may be applied to place the virtual machine in order to balance workloads, to maximize performance, to minimize communication costs with other resources used by the virtual machine, to optimize power consumption in a data center (e.g., to pack virtual machines on a subset of hosts and enable other hosts to be powered down), to co-locate the virtual machine with other related virtual machines, to anti-collocate the virtual machine with other related virtual machines for disaster or high availability planning, etc.

Therefore, in some embodiments of the invention, a score S may be calculated for a combination in some embodiments as follows:

$$S = \sum_{i=1}^{n} f_i w_i$$

where $f_i$ is a factor among a total of n factors and $w_i$ is a weight to be applied to that factor, and where at least one factor $f_i$ is related to a fabric limit and/or fabric capacity.

Returning to block 308, if no candidate combinations are found, control passes to block 318 to determine whether other configuration settings are possible, e.g., to enable a virtual machine to potentially be deployed to any other combinations. If so, control passes to block 320 to modify one or more requirements of the virtual machine, and then to block 302 to determine pools of hosts, storage and fabrics that meet the updated virtual machine requirements, and attempt to identify one or more candidate combinations. If block 318 determines that no other configuration settings are possible, control is instead passed to block 322, whereby routine 300 returns with an error, indicating that no suitable combination was identified.

Figure 8:
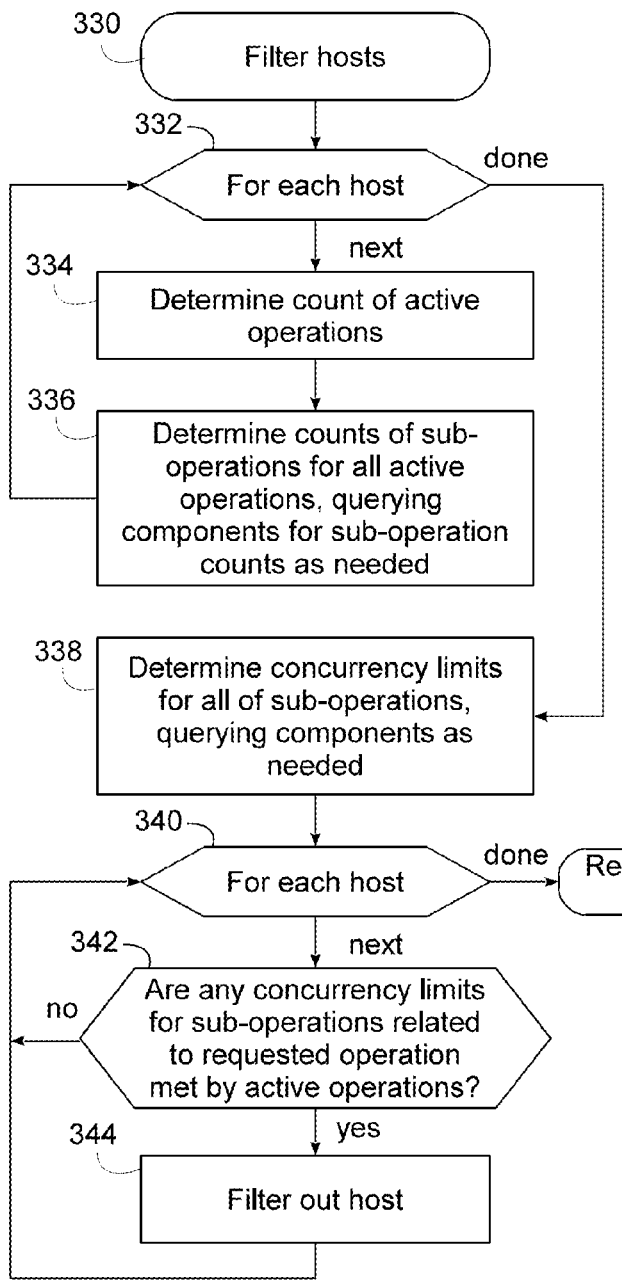
FIG. 8 is a flowchart illustrating a sequence of operations for filtering hosts in the virtualized computing environment of FIGS. 3A-3B.

Now turning to FIG. 8, an example implementation of block 304 is illustrated by sequence of operations 330. In some embodiments, as noted above, hosts may be filtered from consideration for a virtual machine management operation based upon a concurrency limit being met, e.g., based upon at least one concurrency limit for a component involved with one or more sub-operations associated with the virtual machine management operation being met. The filtering may effectively filter a host from consideration by a host placement algorithm, e.g., the host placement algorithm that places virtual machines on hosts as discussed above in connection with FIG. 7. As a result of filtering a host, and assuming another suitable host is identified, the virtual machine management operation will effectively be placed on the other suitable host by the host placement algorithm. Sequence of operations 330, in some embodiments, may monitor active virtual machine management operations on all relevant hosts in the virtualized computing environment and determine, for each of the hosts, whether any of the concurrency limits associated with the sub-operations for the requested virtual machine management operation has been met based at least in part on the monitored active virtual machine management operations on that host. Then, based upon the determination, the sequence of operations may filter any host for which a determination is made that at least one concurrency limit associated with at least one sub-operation for the requested virtual machine management operation has been met from consideration by a host placement algorithm, such that the virtual machine management operation may thereafter be scheduled on a different, non-filtered host.

In one embodiment, for example, sequence of operations 330 receives as input a list of hosts and a requested virtual machine management operation. A FOR loop may be initiated in block 332 to determine the collective availability of each host among the pool of hosts identified in block 302 of FIG. 7 for the requested virtual machine management operation. For each such host, block 334 may determine a count of the active operations being performed by the host (e.g., as logged in the manner discussed above), and then block 336 may determine counts of the sub-operations associated with each of the active operations. In addition, to the extent needed, block 336 may also query any components that are involved with any of the sub-operations to determine the sub-operation counts.

It will be appreciated that in some embodiments, different active operations and/or sub-operations may be analyzed depending upon the requested virtual machine management operation, as some active operations and/or sub-operations may not be relevant to a particular requested virtual machine management operation. It will also be appreciated that different virtual machine management operations may involve different sub-operations, so different combinations of active virtual machine management operations may lead to different sub-operation counts. As but one example, a virtual machine deployment operation may include sub-operations for creating a virtual machine and zoning a fabric switch, which may respectively involve a hypervisor on the host and a fabric switch, whereas a virtual machine resize operation that does not affect storage may involve the hypervisor on the host, but may not involve the fabric switch. Moreover, a component such as a fabric switch may be accessed by multiple hosts, so a concurrency limit such as a maximum number of concurrent zoning operations for a fabric switch may be based upon sub-operations initiated by multiple hosts, and not just a single host, so a concurrency limit being met for such a switch may result in the filtering out of any hosts coupled to that switch. As such, the FOR loop of blocks 332-336 may be used to determine counts of sub-operations across multiple hosts and associated components, but with separate counts maintained as appropriate to determine the availability of a particular host to handle a requested virtual machine management operation.

Once sub-operation counts have been collected across all hosts, block 332 passes control to block 338 to determine concurrency limits for each of the sub-operations, querying any components as needed. Block 340 then initiates a second FOR loop to cycle through each host in the pool of hosts. For each such host, block 342 determines whether any concurrency limits for any sub-operations related to the requested virtual machine management operation have been met by the active operations related to that host. If not, control returns to block 340; however, if any concurrency limit is met, block 342 instead passes control to block 344 to filter out that host, effectively removing that host for placement consideration. Control then returns to block 340 to process the next host. Once all hosts have been processed, block 340 passes control to block 346 to return a filtered list of hosts still available for consideration by the host placement algorithm implemented in FIG. 7.

Figure 9:
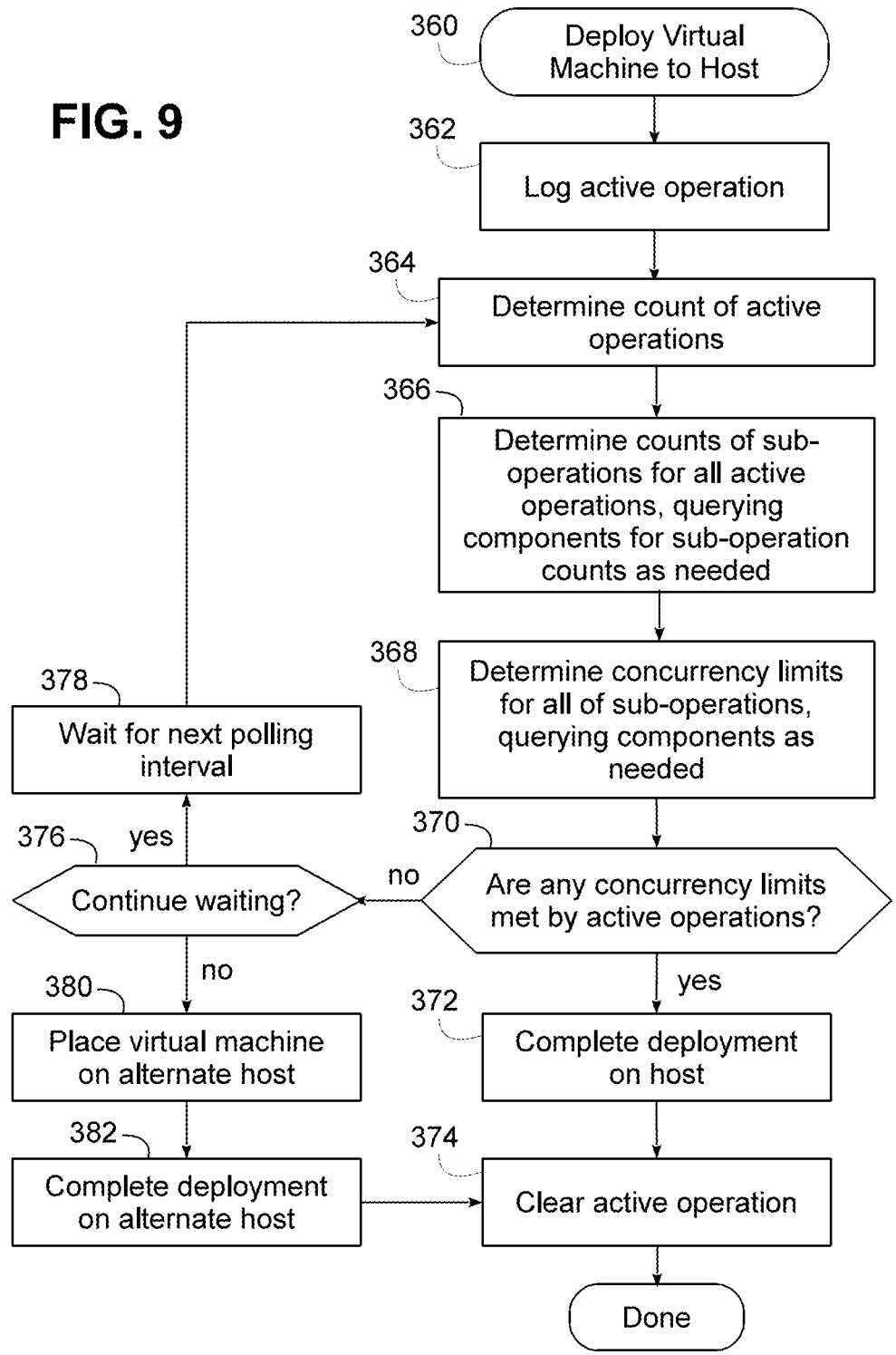
FIG. 9 is a flowchart illustrating a sequence of operations for deploying a virtual machine to a particular host in the virtualized computing environment of FIGS. 3A-3B.

Now turning to FIG. 9, as noted above, in some embodiments, rather than filtering hosts from initial consideration by a host placement algorithm based on concurrency limits, concurrency limits may be used to automatically reschedule a virtual machine management operation on a different host after some period of time has expired during which concurrency limits prevent the virtual machine management operation from being performed on a previously-selected host. In some embodiments, for example, if a concurrency limit associated with a requested virtual machine management operation is found to have been met at a first time, performance of the requested operation may be deferred, and the concurrency limits related to the deferred operation may thereafter be re-checked one or more additional times. If, during any of the subsequent checks of the concurrency limits, the number of active operations in the virtualized computing environment has decreased to a point at which none of the related concurrency limits are met, performance of the requested virtual machine management operation may be initiated on the originally-selected host. Otherwise, if during all of the subsequent checks of the concurrency limits, one or more concurrency limits is still met, performance of the requested virtual machine management operation may be initiated on a different host, e.g., another host from the pool for which a candidate combination for placement exists.

FIG. 9, in particular, illustrates a sequence of operations 360 for deploying a virtual machine to a specified host. Sequence of operations 360 may be called in some embodiments in response to a request to deploy a virtual machine to a user-selected host. Sequence of operations 360 may also be called in some embodiments after a host has been selected by a placement algorithm in response to a request to deploy a virtual machine that does not specify a host. First, in block 362, the active operation is logged, and then in block 364 a count is made of the active operations relevant to the virtual machine deployment operation requested for the host. Then, in block 366 counts are determined for all of the sub-operations for the various active operations, and in block 368, concurrency limits for all of the sub-operations are determined. In both of blocks 366 and 368, components may be queried as necessary to retrieve any sub-operation counts or concurrency limits. Blocks 364-368, in particular, may operate in a similar manner to blocks 334-338 of FIG. 8.

Block 370 then determines whether any concurrency limits have been met by the active operations, and if so, passes control to block 372 to complete deployment of the virtual machine on the host, i.e., to perform the virtual machine management operation as scheduled on the host. Control then passes to block 374 to clear the active operation from the active operation log, and deployment of the virtual machine is complete.

Returning to block 370, if any concurrency limit has been met, control instead passes to block 376 to determine whether to continuing waiting to see if the count of active operations decreases to a level such that no concurrency limits related to the requested deployment are met. In one embodiment, for example, block 376 may determine whether a predetermined number of polling intervals has been reached. If not, block 376 passes control to block 378 to wait for a next polling interval, and then back to block 364 to assess, at a later time, whether any concurrency limits related to the requested virtual machine deployment operation have been met.

If the number of polling intervals has been reached, block 376 instead passes control to block 380 to place the virtual machine on an alternate host, e.g., using the aforementioned host placement algorithm, and additionally verifying, in a similar manner to that described above, that no concurrency limits preclude deployment of the virtual machine on the alternate host. Block 382 then completes the deployment on the alternate host, and passes control to block 374 to clear the active operation from the active operation log, whereby deployment of the virtual machine is complete, but on an alternate host from that originally requested.

Figure 10:
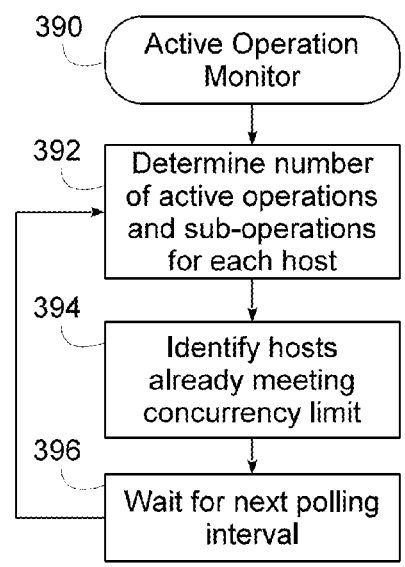
FIG. 10 is a flowchart illustrating a sequence of operations for monitoring active operations in the virtualized computing environment of FIGS. 3A-3B.

It will be appreciated similar functionality to that described above in connection with FIG. 9 may be used to automatically defer (and if necessary, reschedule) other types of virtual machine management operations based on concurrency limits being met. It will also be appreciated that different techniques may be used to monitor and count active operations and their associated sub-operations in other embodiments. For example, FIG. 10 illustrates an example sequence of operations 390 for an active operation monitor that may run, for example, as a background process or thread, and that attempts to maintain an up-to-date availability status for a plurality of hosts for different virtual machine management operations. During each polling interval, for example, block 392 may determine the number of active operations and associated sub-operations for each host, in a similar manner to that discussed above in connection with FIGS. 8 and 9, and then block 394 may identify any hosts that already meet a concurrency limit for a particular type of virtual machine management operation. Block 396 then waits for a next polling interval, before returning control to block 392.

By identifying hosts meeting a concurrency limit for a particular virtual machine management operation, placement logic may determine whether a host is capable of handling a requested virtual machine management operation by querying the availability status of that host as determined by the monitor. In other embodiments, block 394 may be omitted, whereby a determination of availability may include a retrieval of counts determined by the monitor and a comparison of the retrieved counts with concurrency limits associated with the components involved in the sub-operations for a requested virtual machine management operation.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of managing a virtualized computing environment, the method comprising:
   monitoring active virtual machine management operations on a first host among a plurality of hosts in the virtualized computing environment, wherein each active virtual machine management operation includes a plurality of sub-operations with associated concurrency limits that represent maximum numbers of concurrent sub-operations;
   receiving a request to perform a virtual machine management operation, wherein the virtual machine management operation includes at least first and second sub-operations, the first sub-operation associated with a first concurrency limit that is a hypervisor concurrency limit, a storage system concurrency limit, a virtualization library concurrency limit, or a network concurrency limit, and the second sub-operation associated with a second concurrency limit that is a hypervisor concurrency limit, a storage system concurrency limit, a virtualization library concurrency limit, or a network concurrency limit;
   in response to receiving the request, determining whether any of the first and second concurrency limits associated with the first and second sub-operations for the requested virtual machine management operation has been met based at least in part on the monitored active virtual machine management operations on the first host; and
   initiating performance of the requested virtual machine management operation on a second host among the plurality of hosts in response to determining that at least one of the first and second concurrency limits associated with the first and second sub-operations for the requested virtual machine management operation has been met.

2. The method of claim 1, further comprising, in response to the request:
   in response to determining at a first time that at least one concurrency limit associated with at least one sub-operation for the requested virtual machine management operation has been met, deferring performance of the requested virtual machine management operation on the first host; and
   after deferring performance of the requested virtual machine management operation on the first host, determining at a second time whether any of the concurrency limits associated with the sub-operations for the requested virtual machine management operation has been met based at least in part on the monitored active virtual machine management operations on the first host;
   wherein initiating performance of the requested virtual machine management operation on the second host is performed in response to determining at the second time that at least one concurrency limit associated with at least one sub-operation for the requested virtual machine management operation has been met.

3. The method of claim 2, wherein the request specifies the first host.

4. The method of claim 2, further comprising initially scheduling the requested virtual machine management operation on the first host based upon a host placement algorithm.

5. The method of claim 2, wherein the second time is associated with a predetermined number of polling intervals, the method further comprising, in response to the request, determining at each of the plurality of polling intervals that at least one concurrency limit associated with at least one sub-operation for the requested virtual machine management operation has been met.

6. The method of claim 1, in response to receiving a request to perform a second virtual machine management operation:
determining that at least one concurrency limit associated with at least one sub-operation for the requested second virtual machine management operation has been met;
after determining that at least one concurrency limit associated with at least one sub-operation for the requested second virtual machine management operation has been met, determining at each of a plurality of polling intervals whether any of the concurrency limits associated with the sub-operations for the requested second virtual machine management operation has been met based at least in part on the monitored active virtual machine management operations on the first host;
in response to determining during all of the plurality of polling intervals that at least one concurrency limit associated with at least one sub-operation for the requested second virtual machine management operation has been met, initiating performance of the requested second virtual machine management operation on a different host from the first host among the plurality of hosts; and
in response to determining during one of the plurality of polling intervals that no concurrency limit associated with any sub-operation for the requested second virtual machine management operation has been met, initiating performance of the requested second virtual machine management operation on the first host.

7. The method of claim 1, wherein initiating performance of the requested virtual machine management operation on the second host includes:
filtering the first host from consideration by a host placement algorithm in response to determining that at least one concurrency limit associated with at least one sub-operation for the requested virtual machine management operation has been met; and
after filtering the first host, scheduling the virtual machine management operation on the second host using the host placement algorithm.

8. The method of claim 1, further comprising:
monitoring active virtual machine management operations on the plurality of hosts in the virtualized computing environment;
determining, for each of the plurality of hosts, whether any of the concurrency limits associated with the sub-operations for the requested virtual machine management operation has been met based at least in part on the monitored active virtual machine management operations on such host;
filtering any host among the plurality of hosts for which a determination is made that at least one concurrency limit associated with at least one sub-operation for the requested virtual machine management operation has been met from consideration by a host placement algorithm; and
scheduling the virtual machine management operation on the second host using the host placement algorithm based upon the second host not being filtered.

9. The method of claim 1, wherein monitoring the active virtual machine management operations on the first host is performed in response to receiving the request.

10. The method of claim 1, wherein monitoring the active virtual machine management operations on the first host is performed substantially continuously.

11. The method of claim 1, wherein the virtual machine management operation is a virtual machine deployment operation, a virtual machine migration operation, a virtual machine resize operation, a virtual machine delete operation, a virtual machine capture operation, a virtual machine attach volume operation, a virtual machine remote restart operation, or a virtual machine suspend operation.

12. The method of claim 1, wherein each concurrency limit is a hypervisor concurrency limit, a storage system concurrency limit, a virtualization library concurrency limit, or a network concurrency limit.

13. The method of claim 1, wherein each of the first and second concurrency limits is a maximum number of concurrent virtual machine creation operations, a maximum number of concurrent create volume operations, a maximum number of concurrent network zoning operations, or a maximum number of concurrent virtual machine migration operations.

14. The method of claim 1, wherein determining whether any of the first and second concurrency limits associated with the first and second sub-operations for the requested virtual machine management operation has been met includes querying a component in the virtualized computing environment for a concurrency limit for the component.

15. The method of claim 1, wherein determining whether any of the first and second concurrency limits associated with the first and second sub-operations for the requested virtual machine management operation has been met includes querying a component in the virtualized computing environment for a count of active sub-operations for the component.

16. The method of claim 1, wherein the virtualized computing environment comprises a cloud computing environment.

17. The method of claim 16, wherein at least one of the first and second concurrency limits is a concurrency limit in the virtualization or cloud management stack for the first host.

18. The method of claim 1, wherein determining whether any of the first and second concurrency limits associated with the first and second sub-operations for the requested virtual machine management operation has been met is performed by virtual machine scheduler logic.

19. An apparatus, comprising:
at least one processor; and
program code configured upon execution by the at least one processor to manage a virtualized computing environment, the program code configured to:
monitor active virtual machine management operations on a first host among a plurality of hosts in the virtualized computing environment, wherein each active virtual machine management operation includes a plurality of sub-operations with associated concurrency limits that represent maximum numbers of concurrent sub-operations;

receive a request to perform a virtual machine management operation, wherein the virtual machine management operation includes at least first and second sub-operations, the first sub-operation associated with a first concurrency limit that is a hypervisor concurrency limit, a storage system concurrency limit, a virtualization library concurrency limit, or a network concurrency limit, and the second sub-operation associated with a second concurrency limit that is a hypervisor concurrency limit, a storage system concurrency limit, a virtualization library concurrency limit, or a network concurrency limit;

in response to receiving the request, determine whether any of the first and second concurrency limits associated with the first and second sub-operations for the requested virtual machine management operation has been met by the monitored active virtual machine management operations on the first host; and initiate performance of the requested virtual machine management operation on a second host among the plurality of hosts in response to determining that at least one of the first and second concurrency limits associated with the first and second sub-operations for the requested virtual machine management operation has been met by the monitored active virtual machine management operations on the first host.

20. A program product, comprising:

a non-transitory computer readable medium; and program code stored on the non-transitory computer readable medium and configured upon execution by at least one processor to manage a virtualized computing environment by:

monitoring active virtual machine management operations on a first host among a plurality of hosts in the virtualized computing environment, wherein each active virtual machine management operation includes a plurality of sub-operations with associated concurrency limits that represent maximum numbers of concurrent sub-operations;

receiving a request to perform a virtual machine management operation, wherein the virtual machine management operation includes at least first and second sub-operations, the first sub-operation associated with a first concurrency limit that is a hypervisor concurrency limit, a storage system concurrency limit, a virtualization library concurrency limit, or a network concurrency limit, and the second sub-operation associated with a second concurrency limit that is a hypervisor concurrency limit, a storage system concurrency limit, a virtualization library concurrency limit, or a network concurrency limit;

in response to receiving the request, determining whether any of the first and second concurrency limits associated with the first and second sub-operations for the requested virtual machine management operation has been met by the monitored active virtual machine management operations on the first host; and initiating performance of the requested virtual machine management operation on a second host among the plurality of hosts in response to determining that at least one of the first and second concurrency limits associated with the first and second sub-operations for the requested virtual machine management operation has been met by the monitored active virtual machine management operations on the first host.

* * * * *